J. P. APPLEBY.
PROCESS OF MAKING SOLID BALLS.
APPLICATION FILED NOV. 25, 1912.
1,080,798.
Patented Dec. 9, 1913.
4 SHEETS—SHEET 1.
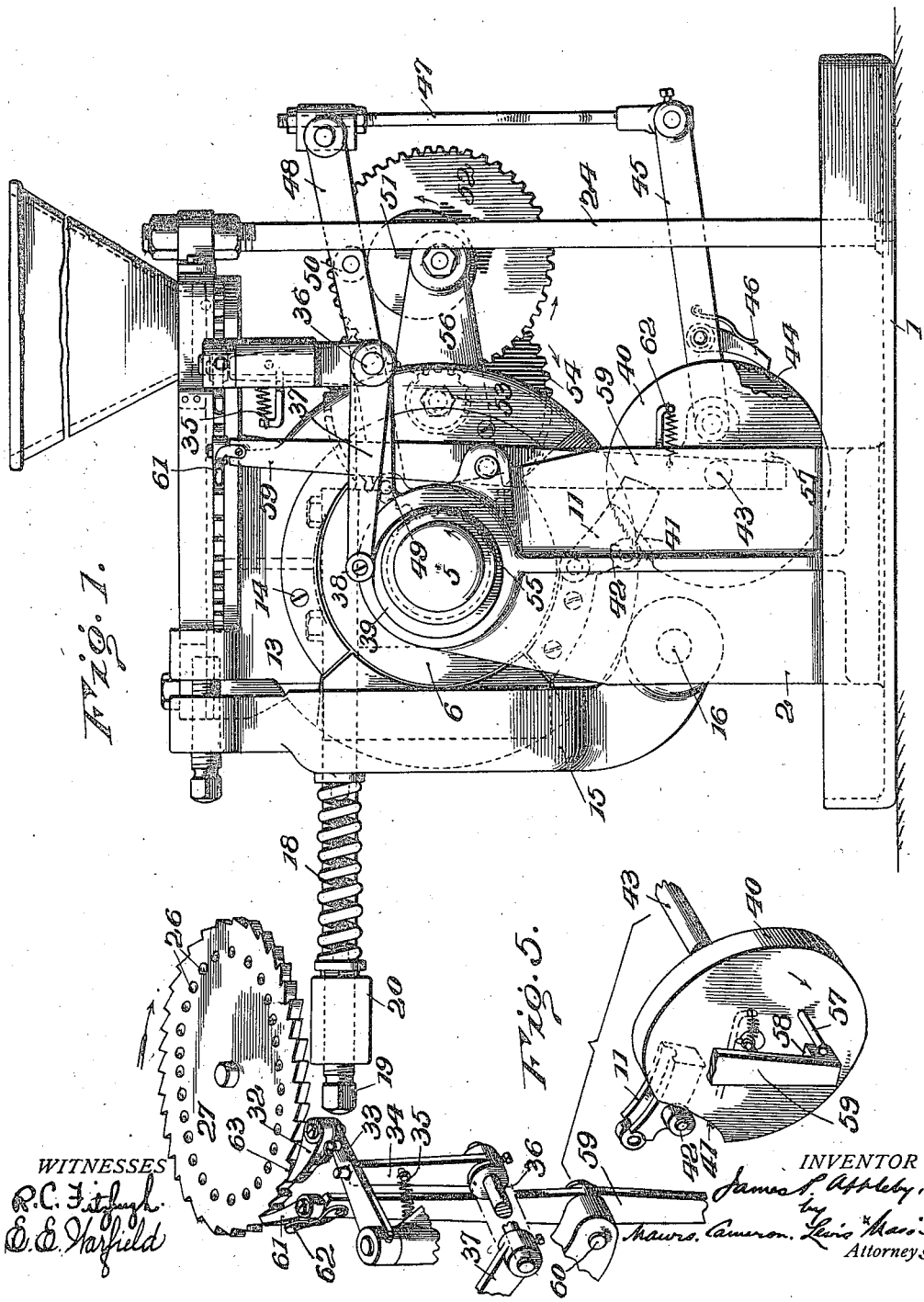

J. P. APPLEBY.
PROCESS OF MAKING SOLID BALLS.
APPLICATION FILED NOV. 25, 1912.
1,080,798.
Patented Dec. 9, 1913.
4 SHEETS—SHEET 2.
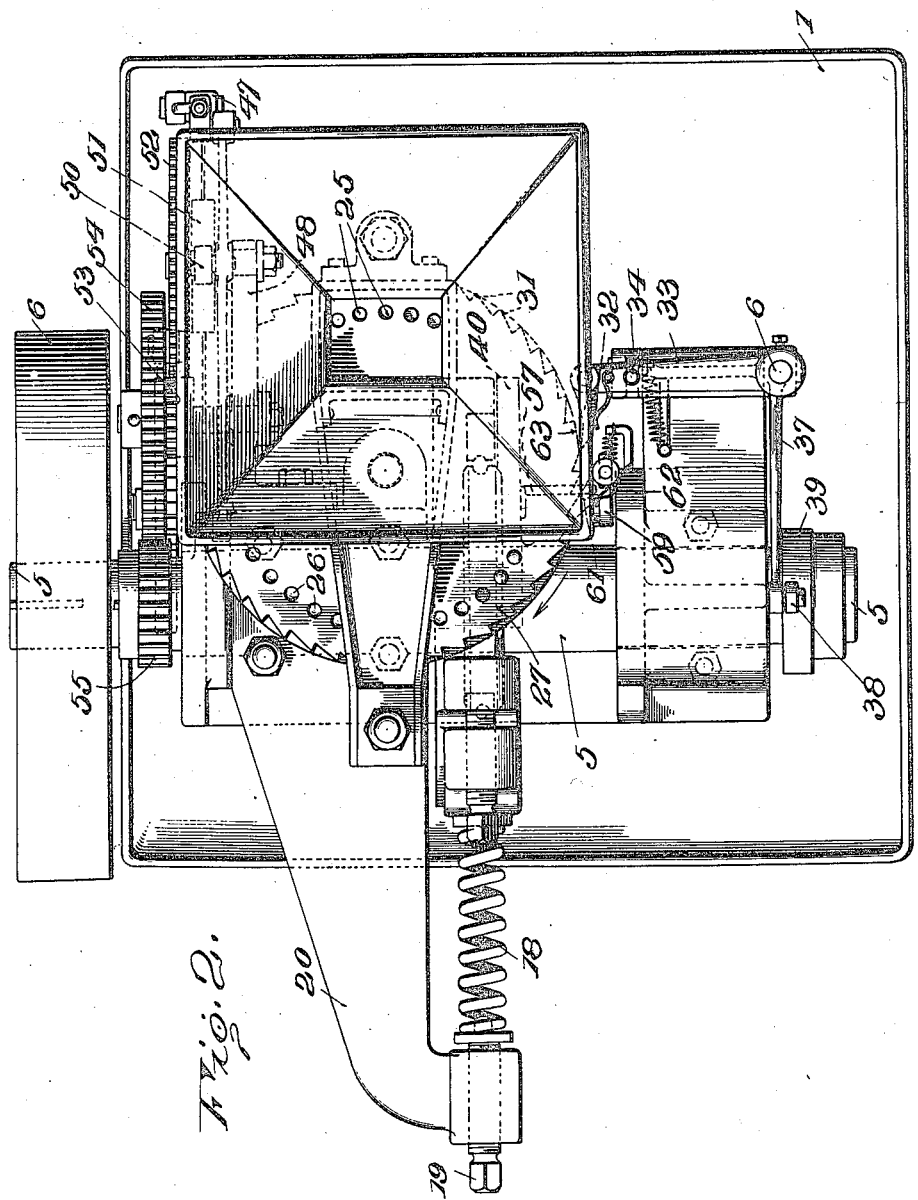
WITNESSES
INVENTOR

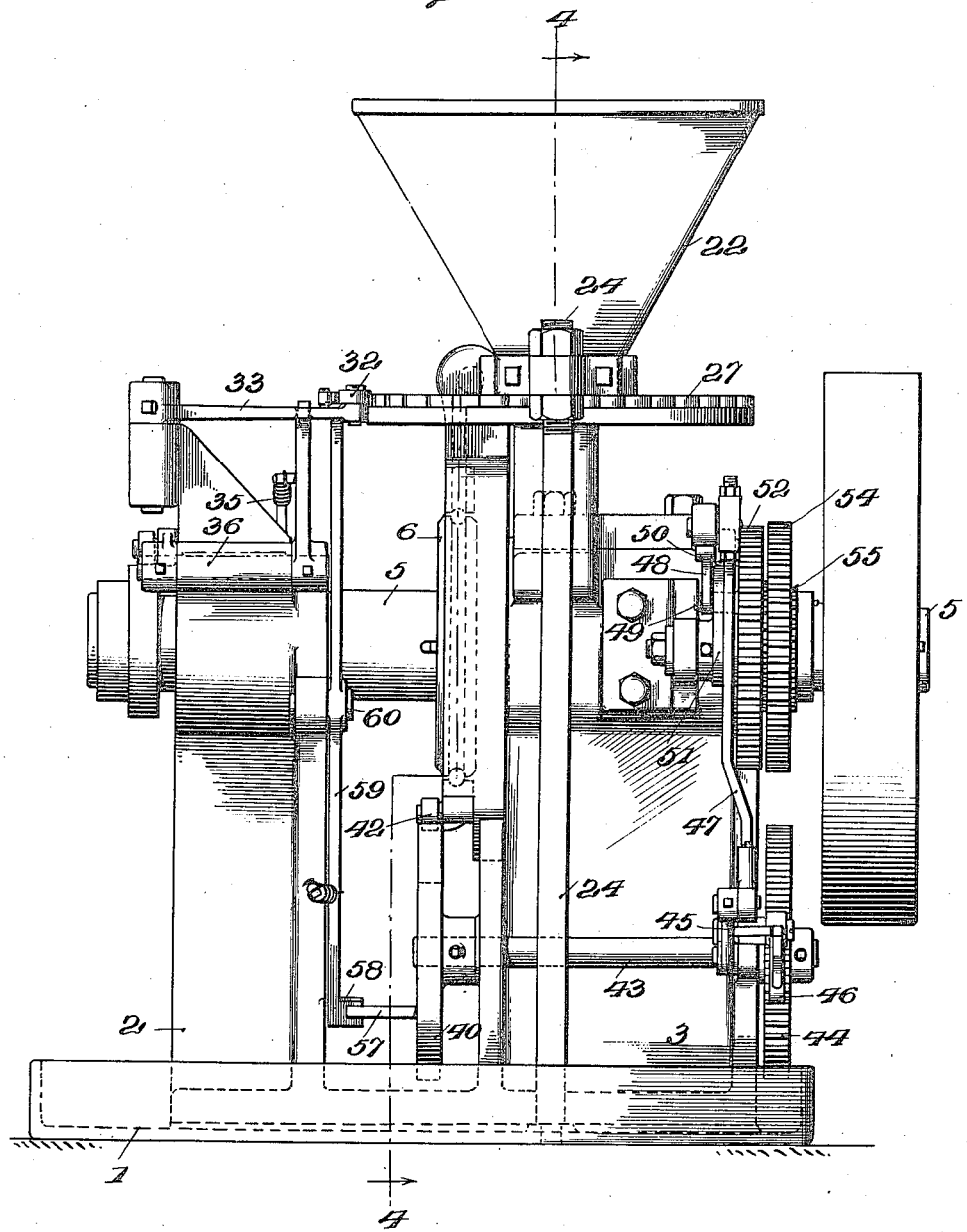

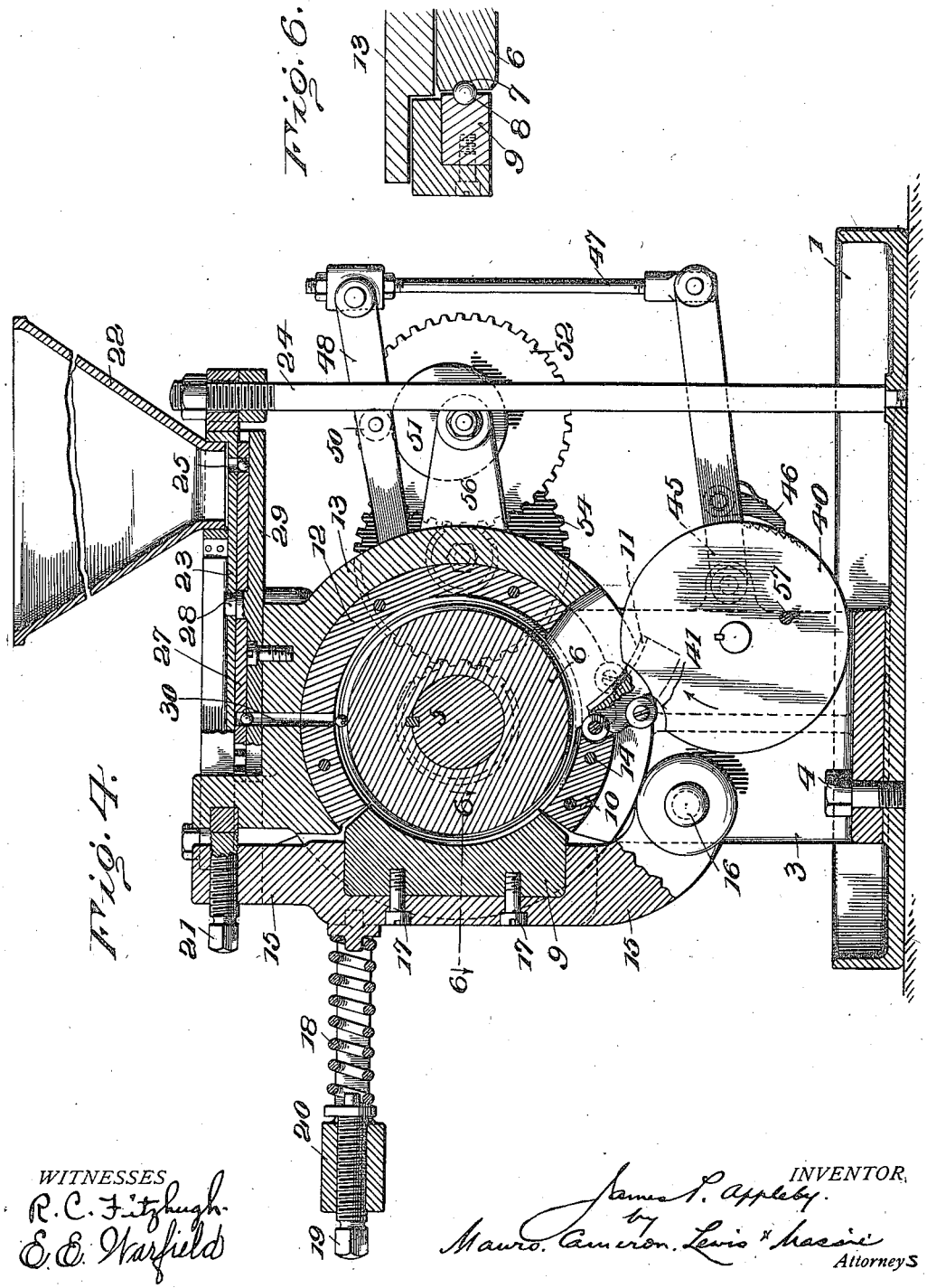

UNITED STATES PATENT OFFICE.

JAMES P. APPLEBY, OF OTTUMWA, IOWA, ASSIGNOR TO JOHNSTON & SHARP MANUFACTURING COMPANY, OF OTTUMWA, IOWA, A CORPORATION OF IOWA.

PROCESS OF MAKING SOLID BALLS.

1,080,798.     Specification of Letters Patent.     Patented Dec. 9, 1913.

Application filed November 25, 1912. Serial No. 733,471.

*To all whom it may concern:*

Be it known that I, JAMES P. APPLEBY, of Ottumwa, Iowa, have invented a new and useful Improvement in Processes of Making Solid Balls, which invention is fully set forth in the following specification.

This invention relates to improvements in making solid balls and has for its object truing and reducing rough solid metal balls by condensing and flaking off the surface to any desired extent to true the surface and produce the desired size and finish.

In the manufacture of solid metal balls, the balls present in their first stages, whether made by casting, turning or swaging, various surface irregularities and imperfections of form. This is particularly the case with balls swaged from rough pieces of wire. Such balls often present a peripheral ring about the equator of the ball and also either raised or flattened poles depending on the size of the stock and character of the dies used in shaping the metal. With a view of removing such defects and of truing the balls, they have heretofore been subjected to the tedious operation of grinding and in the case of steel balls this operation is followed by a subsequent and separate step of hardening which is apt to roughen the surface and require further treatment of the surface to render it smooth.

I have discovered that solid metal balls of the character above referred to may be trued or reduced to size and hardened while materially simplifying the operations by applying pressure to successive portions of the surface of the ball sufficient to condense the outer layers of metal and cause the surface to break into flakes and separate off, whereby the irregularities are reduced and removed. By the continued application of this operation the ball may be reduced to any desired and uniform size in a rapid and satisfactory manner.

My invention resides, therefore, in a method of truing and reducing to size solid metal balls by condensing successive portions of the surface of the ball and flaking off the surface so condensed.

By way of illustrating one means for carrying out my process, I have shown and described a machine suitable for the purpose. It is to be understood, however, that the method is not to be restricted to the use of the particular machine herein described, as it may be carried out by other apparatus. I prefer, however, to use my improved machine herein described.

My method briefly described consists in forming or taking a solid metal ball, such as a ball made of steel, and subjecting it to pressure applied progressively over its surface and of sufficient intensity to condense the surface layers of the metal on the undisturbed interior mass and while so condensing and stratifying the surface to apply a sliding or frictional pressure to the condensed layer to cause flaking and breaking up the stratified surface. In practice, it has been found that the flakes from balls finishing to about 0.25 in. diameter may be very thin, calipering from .001 in. to .00025 in. The small amount of metal thus successively removed in form of flakes enables very accurate truing of the balls. In this operation the high irregularities are flaked off to the bottom of the depressions on the surface and by a continuation of the operation the surface may be uniformly removed to reduce the diameter of the ball to any extent desired. The ball now presents a practically spherical form with a uniform, but not a polished surface. This may be produced by the usual methods of abrasion which can now be effected with ease and readiness, since the surface irregularities are minute. Balls thus treated are of necessity of less diameter than the original swaged balls, therefore in making finished balls to size the swaged balls should have diameters slightly in excess of the final diameter to allow for reduction. The surface of the finished balls is condensed and hardened by the operation and is sufficiently accurate for many uses demanded by the trade.

While my process is more particularly adapted for use in making and finishing steel balls, it is to be understood that it may be applied in making balls of other metals and of other material capable of flaking under the operations above described.

My machine primarily includes in combination a stationary interiorly grooved ring formed in sections; a revoluble exteriorly grooved disk located within this ring, the opposing grooves forming a track into which the balls are fed, means for yieldingly pressing one section of the ring toward the disk and against the balls whereby the latter are subjected to pressure causing their surfaces to flake while they revolve as they are advanced by the disk and means for discharging the balls and the flakes disengaged from the balls while they run loosely and rattle together in the grooves after passing the yielding section. An automatically operated feed device preferably supplies the balls to the groove and is controlled to permit each charge of balls to remain under the flaking action of the machine before they are discharged. The section of the ring which is yieldingly pressed toward the periphery of the disk and acts with the disk to size the balls is made of hardened steel. The remaining sections of the disk which do not sustain the work of sizing may be of softer metal. Thus when a ball comes between the yielding section and the periphery of the revolving disk, the part of the ball in contact with the bottom of the groove in the disk will travel at the same peripheral speed as does the disk and the part of the groove which reaches up around the ball coming very closely to the axial point of the ball travels faster than that part of the ball. A sliding motion results while the ball is under heavy pressure. The inner solid mass resists this pressure and enables the surface or skin of the ball to condense and flake and disengage itself therefrom. The high spots are thus removed and by continuing the flaking the grooves close and the ball is reduced to size. The flaking is assisted by presence of oil.

In order that the invention may be more readily understood, reference is had to the accompanying drawings, which are designed merely as illustrations to assist the description of the invention and not as defining the limits thereof in which—

Figure 1 is a view in end elevation of my machine; Fig. 2 is a plan view of Fig. 1; Fig. 3 is a side elevational view looking from the right hand side of Fig. 1; Fig. 4 is a view in vertical section taken on line 4—4 of Fig. 3; Fig. 5 is a detail view of the feed driving means, and Fig. 6 is a sectional detail on line 6—6 of Fig. 4.

Referring to Figs. 1 to 3 of the drawings, 1 designates a dish-shaped bed plate to which standards 2, 3, for supporting parts of the machine are made fast by securing means such as by bolts 4, one of which is shown in Fig. 4. Mounted in suitable bearings in the uprights 2—3 is a shaft 5 driven by a belt pulley. To this shaft 5 is secured a disk 6, preferably of hardened steel in the periphery of which is a semi-circular groove 7 which faces a corresponding groove 8 in a stationary ring consisting of sections 9, 10, 11 and 12. Sections 10 and 12 of this ring are rigidly secured to a part 13 of the standard 3 by bolts 14. Section 11 is pivotally supported to the same part 13 of the standard 3 and section 9 which is of hardened steel is mounted in a bracket arm 15 pivoted at 16 to the frame and it is secured in its place by screws 17. The bracket arm 15 is yieldingly pressed toward the disk 6 by a spring 18 which is held under compression by a set screw 19 working in a threaded recess of the stationary bracket arm 20. The upper end of bracket arm 15 which carries section 9 is provided with an adjustable stop 21 for limiting the approach of section 9 to the revoluble disk 6.

The feeding device which supplies the swaged balls to the truing grooves comprises a stationary hopper 22 mounted on a plate 23 secured at one end to the frame and at the other end to a supporting rod 24. In plate 23 are one or more openings 25 located within the delivery end of the hopper and which are adapted to register with openings 26 formed in a disk 27 mounted to revolve about a pin 28 which projects from a plate 29 serving to support disk 27 and to hold the balls in place as they are carried forward to a discharge channel 30 leading to the truing grooves. A step by step motion is imparted to the ball feeding disk 27 by ratchet mechanism and for this purpose disk 27 is provided with ratchet teeth 31 of uniform size except one which will be described later.

Referring more particularly to Figs. 2 and 5, a spring-pressed pawl 32 is mounted on a horizontally swinging arm 33 which has a loose engagement with a vertical rocking arm 34 normally under spring tension by a spring 35 which rocks the arm forward when not otherwise restrained. Rocking arm 34 is fast to one end of a shaft 36, to the opposite end of which is secured an arm 37 carrying a friction roller 38 contacting with a cam 39 on the main drive shaft 5. It will be seen from this construction that each revolution of the cam 39 actuates the spring pawl 32 forward and advances the ball feeding disk 27 the distance of one tooth on its periphery, this distance corresponding to the spaces between the cavities 26 in the disk 27. This movement of the feeding disk continues until the last tooth is reached which presents more surface than the others and then the movement of the disk stops for a predetermined time to allow the truing operation of the grooves to reduce the balls to the finished size when they are automatically discharged from the grooves. To effect this result and to start the feeding disk 27 rotating the following means are provided.

Beneath the pivoted discharge section 11 is located a cam disk 40 having in its periphery a reëntering cam surface 41 into which the roller 42 of section 11 drops when it rolls off the supporting cam surface of disk 40, thereby permitting the section 11 to drop and discharge the balls from the truing grooves into the cup-shaped base plate 1 or other receptacle. Cam disk 40 receives its movement from a shaft 43, Fig. 3, to one end of which it is fast, the opposite end of shaft 43 being provided with a driving ratchet wheel 44 which determines by its rate of movement the times of opening and closing of the discharge section 11, depending on the length of time the balls are to remain in the machine or on the degree of accuracy as to size and finish desired. Pivotally mounted on the frame near the ratchet wheel 44 is a lever 45 carrying a spring-pressed pawl 46 engaging the ratchet wheel 44. The outer end of this lever 45 is pivotally connected through member 47 with a rocking arm 48 hinged at 49 to the main frame. Arm 48 carries a friction roller 50 riding on the surface of a cam 51 driven from main shaft 5 through a train of gears 52, 53 and 54, mounted on a bracket arm 56 and driven by gear wheel 55 on shaft 5. For each revolution of cam 51, pawl 46 advances ratchet wheel 44 one tooth at a time, and this movement is transmitted to cam 40 through shaft 43. On cam 40 is a stud 57 which lies in the path of a projection 58 on lever 59 fulcrumed at 60 on a stationary part of the machine. The upper end of lever 59 carries a spring-pressed pawl 61 adapted to engage the teeth of disk 27 and normally tends to move forward under the action of a spring 62. On feed disk 27 is one tooth 63 over which pawl 32 cannot normally ride, due to the fact that this tooth has a dwell portion longer than the throw of the pawl. When this tooth is reached, pawl 32 does not advance the feed disk until the latter is moved by pawl 61. This occurs when stud 57 engages projection 58 of lever 59 to draw pawl 61 back and then releases the lever to be acted on by spring 62 and thereby throw pawl 61 forward to advance disk 27 sufficiently to permit pawl 32 to pass over the dwell tooth 63. The feed disk then begins another revolution. Just before this revolution begins the section 11 is lifted to close the grooves by means of roller 42 which is lifted out of the cam depression 41 by rotation of cam disk 40. The movement of this disk 40 is so timed as to permit ample time for the balls in the truing grooves to be properly reduced to size before it acts on section 11 to discharge the balls.

The operation of the machine will be readily understood from the preceding description. The balls as they come from the upsetting or forging machine and which are made nearly of the desired size are placed in the hopper 22 and drop into the holes 26 in the feed disk 27 as it passes under the delivery end of the hopper. One by one the balls are dropped into channel 30 opening to the truing grooves 7 and 8. When the feed disk 27 has completed one revolution the grooves are supplied with the requisite number of balls on which to operate and the feed stops as the dwell tooth on the feed disk 27 reaches pawl 32. Each ball in succession is subjected between the hardened section 9 and the revolving disk 6 to a regulated spring pressure and to the frictional flaking action of the sides of the groove in the revolving disk 6 where the differential surface velocities of the sides of the groove and that of the balls occur as above explained. The balls are carried around between the grooves in the stationary ring and the revolving disk many times, thereby assuring a uniform flaking of their surfaces before they are discharged from the machine. Where great degree of accuracy as to size and finish is not required, it is obvious that the balls may be passed a fewer number of times between the flaking surfaces or only once or the gate 11 may be left open and the balls returned to the hopper to be passed through the machine as often as the nature of the work requires.

The balls delivered from the machine may have flakes adhering to their surface. These may be removed by rattling them after which the balls may be polished in a rumble or other suitable polishing device.

The spring 18 effects the rolling of the balls until the inward movement of bracket 15 is arrested by stop screw 21 which is so positioned that the balls are reduced to size at or about the time cam 40 acts to discharge the balls from the machine. To permit proper adjustment of section 9 toward the periphery of disk 6 its sides where they join with other sections of the stationary ring are cut away slightly as appears in Fig. 4.

What is claimed is:—

1. A method of truing and reducing solid balls consisting in subjecting each ball to pressure sufficient to condense the outer layers and directing said pressure in lines tangential to successive portions of the surface and thereby flake off the layers to true the ball.

2. A method of truing and reducing solid balls consisting in rotating each ball while subjecting it to pressure sufficient to condense the outer layers and directing said pressure in lines tangential to successive portions of the surface and thereby flake off the layers to true the ball.

3. A method of truing and reducing solid balls consisting in rotating each ball while subjecting it to pressure sufficient to condense the outer layers and directing said pressure in lines tangential to successive portions of the surface and thereby flake off the layers to true the ball and separating adhering flakes from the balls by rattling them together.

4. A method of truing and reducing solid balls consisting in rotating each ball while subjecting it to pressure sufficient to condense the outer layers and directing said pressure in lines tangential to successive portions of the surface and thereby flake off the layers to true the ball, separating adhering flakes from the balls by rattling them together and polishing the surfaces by abrasions.

5. A method of truing and reducing solid balls consisting in subjecting each ball to a yielding pressure sufficient to condense the outer layers without disturbing the interior mass and directing said pressure in lines tangential to successive portions of the surface and thereby flake off the layers to true the ball.

6. A method of truing and reducing solid balls by flaking off their surfaces consisting in rolling each ball between grooved surfaces one of which rotates and under pressure sufficient to condense the outer layers of the surface and separating said layers from the ball by the sliding action between the sides of the rotating groove and the surface of the ball.

7. A method of truing and reducing solid balls consisting in condensing the surface of the ball and flaking off said surface.

8. A method of truing and reducing solid balls consisting in condensing the surface of the ball and flaking off said surface in presence of oil.

In testimony whereof I have signed this specification in the presence of two subscribing witnesses.

JAMES P. APPLEBY.

Witnesses:
F. W. SHARP,
GEO. F. HALL.